Patented July 15, 1952

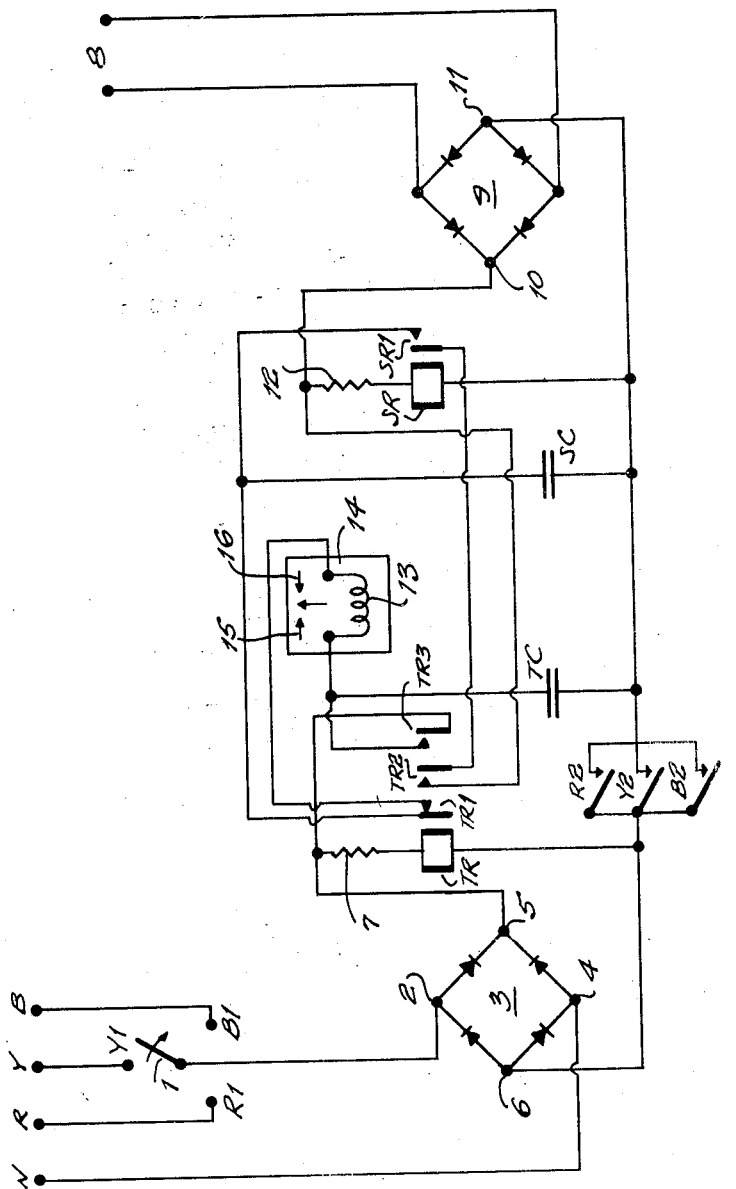

2,603,689

UNITED STATES PATENT OFFICE 2,603,689

DETECTION OF VOLTAGE OR CURRENT VARIATIONS IN ELECTRIC CIRCUITS

Sydney Arthur Stevens and Harry Duckitt, London, England, assignors to Westinghouse Brake and Signal Company Limited, London, England Application April 16, 1949, Serial No. 87,972
In Great Britain May 3, 1948

1 Claim. (Cl. 175—320)

This invention relates to the detection, measurement or correction of voltage or current variations in electric circuits and has for its object to provide improved apparatus for this purpose capable of detecting, measuring or correcting variations from a given standard of reference in one or a number of different circuits or variations occurring during predetermined intervals of time in the same circuit.

According to the invention a unidirectional voltage derived from the circuit or each of the circuits corresponding to the voltage or current therein is arranged to be, automatically at regular or irregular intervals of time, impressed upon a separate circuit in opposition to a voltage derived from the standard of reference or a voltage previously derived from the circuit, the current in the separate circuit due to any difference between the derived voltages simultaneously impressed upon the separate circuit being arranged to operate any suitable form of indicating, measuring or correcting device.

Preferably each of the voltages derived as above described is arranged to be temporarily stored in a condenser which is automatically connected for charging and connected to the separate circuit alternately.

The invention is particularly applicable to the control of polyphase alternating current circuits in which the several phase voltages are required to be closely balanced and the invention is illustrated by way of example in the accompanying diagrammatic drawing as applied to the phase balancing of a three phase alternating current supply circuit by apparatus embodying one form of the invention.

Referring now to the drawing it will be seen that the apparatus comprises a rotating contact arm 1 driven at a suitable speed by motor mechanism (not shown) so as to make electrical contact in cyclic order with fixed contacts R1, Y1, B1 connected to the phase conductors R, Y, B of the three phase supply circuit. The contact arm 1 is connected to one input terminal 2 of a first bridge-connected rectifier system 3, the other input terminal 4 of the rectifier system 3 being connected to the neutral conductor N of the supply circuit. The output terminals 5, 6 of the rectifier system 3 are connected, in series with a relatively high resistance 7 to the energising winding of a relay TR (hereinafter termed the testing relay).

A standard reference voltage is derived from the conductors 8 of a source of single phase alternating current voltage through a second bridge-connected rectifier system 9 the output terminals 10, 11 of which are connected, in series with a relatively high resistance 12, to the energising winding of a relay SR (hereinafter termed the standard relay) which is thus normally energised from the conductors 8.

Two condensers TC and SC (hereinafter termed the testing condenser and the standard condenser respectively) are connected in series with one another in a circuit (hereinafter termed the third circuit) also including the energising or operating winding 13 of a polarised relay 14 and a normally closed contact TR1 of the testing relay TR, this contact being closed when the relay is in the de-energised position.

The output terminals 10, 11 of the rectifier system 9 connected to the standard relay SR are also connected to the terminals of the standard condenser SC through a circuit termed hereinafter the second circuit and including a normally open contact TR2 of the testing relay TR and a normally closed contact SR1 of the standard relay SR, these contacts being closed by the energisation of the testing and standard relays TR and SR respectively. The circuit connecting the output terminals 10, 11 with the standard condenser SC is termed hereinafter the second circuit.

The output terminals 5, 6 of the rectifier system 3 connected to the testing relay TR are also connected to the terminals of the testing condenser TC through a first circuit hereinafter termed the first circuit and including a normally open contact TR3 of the testing relay TR this contact being closed when the relay TR is energised. This circuit also includes three contacts R2, Y2, B2 operated by the rotating arm 1 which are closed in cyclic order as the arm 1 is connected to the three phase conductors R, Y, B and are opened just before the arm 1 breaks contact with these phase conductors. These three R2, Y2, B2 contacts will be hereinafter referred to as the break contacts.

The polarised relay 14 is of a type comprising two contacts 15, 16 one or other of which is arranged to be closed in accordance with the direction of flow of current in the relay winding 13 and the contacts 15, 16 are connected in the energising circuits of relays or other devices controlling mechanism (not shown) for increasing or decreasing respectively the voltage of the phase conductors R, Y, B of the supply circuit.

The operation of this form of apparatus is as follows:

As the contact arm 1 is rotated and comes into engagement with the contacts R1, Y1, B1 in succession the corresponding phase conductors R, Y, B are each successively connected for a short interval of time to the input terminal 2 of the rectifier system 3, the other input terminal 4 being continuously connected to the phase conductor N. During each engagement of the arm 1 with a fixed contact R1, Y1, B1, unidirectional current is therefore supplied from the output terminals 5, 6 of the rectifier system 3 to energize the testing relay TR.

So long as a standard reference voltage is maintained at the terminals 8, the standard relay SR is energised continuously from the output terminals 10, 11 of the rectifier system 9 and the contact SR1, is therefore closed.

So long as the testing relay TR is energised from one of the phase conductors R, Y, B as above explained the contact TR1 of the relay TR is open and the contacts TR2 and TR3 of this relay are closed. The contacts R2, Y2, or B2, as the case may be, are also closed under these conditions and the testing condenser TC is accordingly charged from the output terminals 5, 6 of the rectifier system 3 to a voltage corresponding to the voltage of the phase conductor in question through a circuit including relay contact TR3, and one or other of the contacts R2, Y2 or B2.

At the same time the standard condenser SC is charged from the output terminals 10, 11 of the rectifier system 9 to a voltage corresponding to the standard voltage of the source 8 through a circuit including the relay contacts TR2 and SR1.

Shortly before the rotating contact arm 1 leaves the fixed contact R1, Y1 or B1 the charging circuit of the testing condenser TC is interrupted at the contact R2, Y2 or B2 so that this condenser is isolated from the three phase supply circuit and the resistance 7 and relay TR.

As soon as the rotating contact arm 1 becomes disconnected from the phase conductor contact R1, Y1 or B1 the testing relay TR is deenergised opening contacts TR2 and TR3 thereby ensuring that condensers SC and TC are isolated, and closes its contact TR1 included in the circuit of the polarised relay winding 13. This circuit is now subject to the opposing voltages of the two condensers SC and TC and in the event of the voltage of the testing condenser TC being greater or less than that of the standard condenser SC, current in a corresponding direction of flow will traverse the energising winding 13 of the polarised relay 14 which will thus be operated to close one or other of its fixed contacts 15, 16 to cause a decrease or increase in the voltage of the phase conductor to be effected.

The cycle of operations above described will be repeated for each phase conductor R, Y and B in turn as the contact arm 1 rotates and the voltage of each phase conductor will thus be corrected to correspond with the standard reference voltage.

It should be noted that the resistance 7 and relay TR provide a load across rectifier 3, so that if the succeeding phase voltage to be measured is lower than the preceding one, the voltage of condenser TC can fall by discharging through resistance 7 and relay TR until it has fallen to the new value of the output voltage of rectifier 3.

Similarly, whenever contact TR2 closes the voltage of condenser SC is equalised with respect to the output voltage of rectifier 9, discharging if necessary via resistance 12 and relay SR.

In the apparatus above described it will be seen that the testing condenser TC is charged to approximately the peak voltage of the phase conductors R, Y, B in turn, but if desired a relatively high inductance may be connected in the condenser circuit so as to cause the condenser TC to be charged to a voltage which is more nearly the mean voltage of the phase conductor.

It will be understood that closure of a fixed contact 15, 16 of the polarised relay 14 or of a following relay to effect the correction of a phase conductor voltage must continue for a period of time which is slightly less than that required to effect the necessary voltage correction in order to prevent "hunting."

The standard condenser SC can be made to act as a smoothing circuit in the event of the voltage correcting or regulating device for one phase conductor becoming inoperative for any reason and enables the voltages of the other phase conductors to continue to be corrected to the value of the inoperative one, by the simple expedient of switching off the standard reference supply.

Although the apparatus has been described and illustrated as applied to the phase balancing of a polyphase circuit it will be understood that this apparatus with slight modification may also be applied to the detection, measurement or correction of voltage or current variations in a number of separate alternating current supply circuits for the purpose of ensuring equal distribution of load for example.

The apparatus of the invention possess the important advantage that the relay effecting the required voltage correction is never connected to the supply circuit conductor and cannot thus be continuously overloaded.

In another form of the invention the rotating contact arm 1 or its equivalent is arranged to connect a testing condenser to a charged conductor intermittently at predetermined intervals of time, the relay (which may be polarised or non-polarised) actuated by the current from the two condensers thus serving to indicate the change in the voltage of the charged conductor during the period of disconnection. In this manner the rate of change of the voltage of this conductor, which can be arranged to be dependent on any required variable, will be indicated or measured by the relay or the latter can be arranged to effect any desired action dependent on this variable.

The intermittent connection and disconnection of the condensers according to the invention can evidently be arranged to be effected otherwise than by a rotating contact arm, as, for example, by means of a series of relays operating automatically in continuous succession and suitable transformers or amplifying devices may be interposed if necessary between the condensers and the relay actuated thereby.

Although the invention has been described as applied to the detection, measurement or correction of voltage variation it will be understood that current variations may be similarly detected, measured or corrected by arranging for the voltages impressed upon the condensers to be derived from suitable devices dependent upon such current variations.

In these and other respects the invention is evidently not limited to the particular forms of apparatus above described and illustrated by way of example.

Having thus described our invention, what we claim is:

Apparatus for detecting variations of a polyphase alternating voltage from a standard voltage, comprising in combination, a source of polyphase alternating voltage; a standard source of single phase alternating voltage; a first rectifier having input terminals and output terminals; first contact means connecting each phase of the polyphase alternating voltage successively across said input interminals of said first rectifier for a predetermined length of time; a testing relay having a plurality of normally open contacts and a normally closed contact and being connected to said output terminals of said first rectifier; a testing condenser; second contact means being closed together with said first contact means and opened shortly before the opening of said first contact means; a first circuit connecting said testing condenser to said output terminals of said first rectifier and including in series one of said normally open contacts of said testing relay and said second contact means; a second rectifier having input terminals connected to said standard source and output terminals; a standard relay having a normally open contact and being connected to said output terminals of said second rectifier; a standard condenser; a second circuit connecting said standard condenser to said output terminals of said second rectifier and including in series another of said normally open contacts of said testing relay and said normally open contact of said standard relay; a polarized relay having an operating winding; and a third circuit including in series said testing condenser, said operating winding of said polarized relay, said normally closed contact of said testing relay and said standard condenser, said condensers being connected in said third circuit so that the polarity of the charge of one of said condensers is opposite to that of the other of said condensers.

SYDNEY ARTHUR STEVENS.
HARRY DUCKITT.

REFERENCES CITED

The following references are of record in the file of this patent:

UNITED STATES PATENTS

| Number | Name | Date |
|---|---|---|
| 1,602,882 | Chubb | Oct. 12, 1926 |
| 2,285,482 | Wunsch | June 19, 1942 |
| 2,466,079 | Brunt | Apr. 5, 1949 |
| 2,480,063 | Wall | Aug. 23, 1949 |
| 2,485,730 | Giffen | Oct. 25, 1949 |
| 2,504,996 | MacDonald | Apr. 25, 1950 |